Oct. 21, 1930.   W. J. HANDLEY   1,779,128
IMMERSION ELECTRICAL WATER HEATER AND METHOD OF OPERATING THE SAME
Filed Sept. 22, 1927
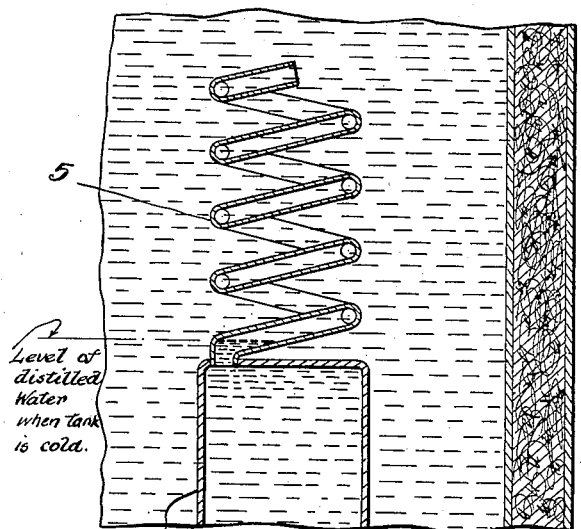
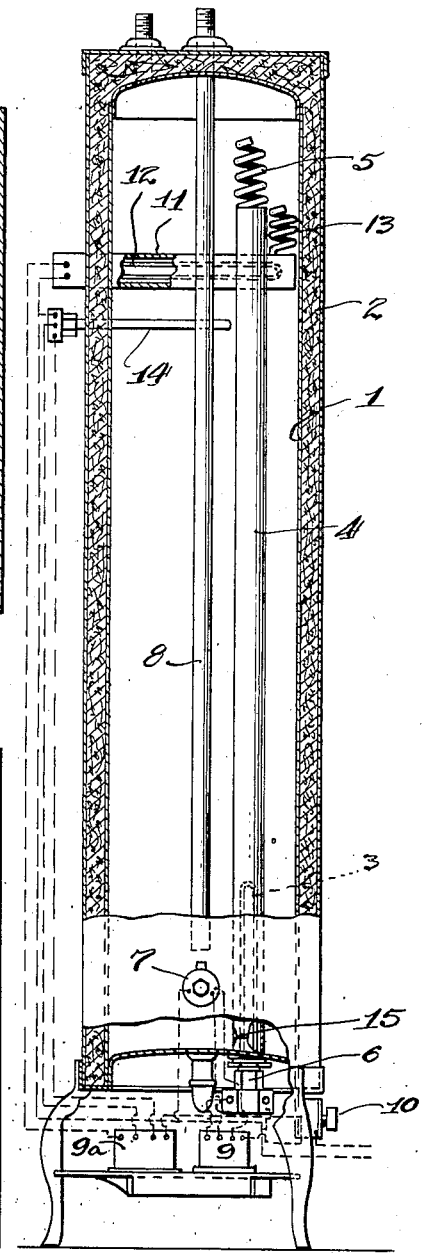
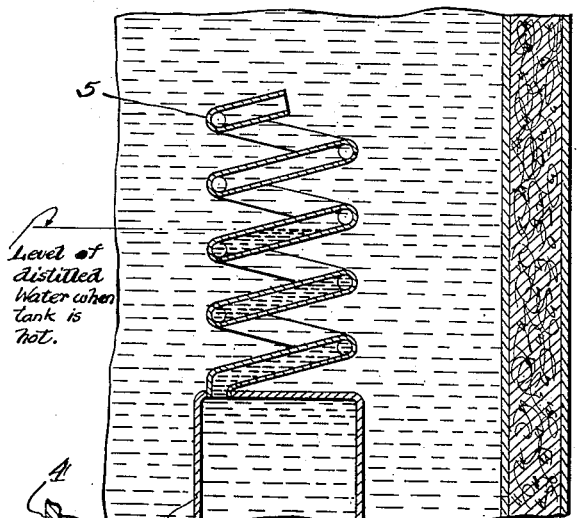
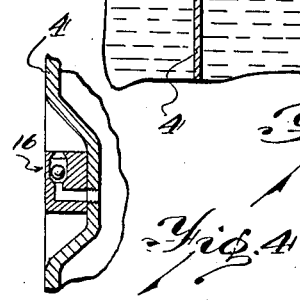
INVENTOR.
William J. Handley.
BY
Stuart C. Barnes
ATTORNEY.

Patented Oct. 21, 1930

1,779,128

UNITED STATES PATENT OFFICE

WILLIAM J. HANDLEY, OF JACKSON, MICHIGAN, ASSIGNOR TO HANDLEY-BROWN HEATER CO., OF JACKSON, MICHIGAN, A CORPORATION OF MICHIGAN

IMMERSION ELECTRICAL WATER HEATER AND METHOD OF OPERATING THE SAME

Application filed September 22, 1927. Serial No. 221,161.

This invention relates to an immersion electrical water heater and method of operating the same, and has to do particularly with an extremely simple, inexpensive water heater of novel design and utilizing electrical resistance units as a heating medium, the heating units being so designed and positioned within the heater whereby a large volume of water is maintained at approximately uniform temperature with a relatively low fuel consumption.

The greater percentage of water heaters utilize gas as the heating medium. However, in some localities electric water heaters are more desirable if not necessary but where electric water heaters have been heretofore used considerable difficulty has been experienced where the electric resistance elements have been immersed in the water, due to the formation of scale on the surfaces of the resistance elements resulting from the depositing of impurities in the water. This more or less hard, adhering crust on the resistance elements usually gradually builds up and materially reduces the efficiency of such resistance elements. Attempts have been made to overcome this formation of scale by providing a large number of electric resistance elements and maintaining such elements at a temperature low enough to prevent material formation of the scale. However, such installations have been very expensive and have not materially reduced the formation of scale.

It is the object of the present invention to provide electric resistance elements which are adapted to efficiently heat the water and at the same time prevent the formation of the scale on the resistance element or elements. This is accomplished by providing an independent tube or conduit within the water heater and positioning the resistance element within this secondary tube or conduit, said tube being filled with distilled water whereby to prevent the formation of scale upon the resistance elements, while at the same time readily transmit heat units from the resistance element to the main body of water in the tank.

Another feature of the present invention resides in the provision of a novel means for maintaining an open passageway between the water within the heating tube and the water in the tank whereby to permit expansion of the water in the heating tube and at the same time substantially prevent any mixing of the water in the tank and the distilled water in the heating tube.

Still another feature of the present invention has to do with the provision of a water tank having a relatively large capacity and electric resistance heating means of relatively low consumption whereby to maintain a large constant supply of heated water without the necessity of at any time requiring peak loads.

Still another feature relates to the manner of arranging the resistance elements, and the method of controlling the passing of the current through the elements whereby to provide for relatively instantaneous heating for short periods of time, and for general heating the greater part of the time.

In the drawings:

Fig. 1 is a vertical longitudinal section through an electric hot water heating tank embodying the features of my invention and illustrating in particular the preferred arrangement of electric heating units and controlling units therefor.

Fig. 2 is an enlarged fragmentary detail view showing the preferred construction of the upper part of the heating tube whereby to prevent intermixture of the water in the tank and the water within the top of the heating tube.

Fig. 3 is an enlarged fragmentary view similar to Fig. 2 but illustrating the extent of upward movement of the distilled water in the coils when the distilled water and the water in the tank is hot.

Fig. 4 is a fragmentary detail view of a section of the lower end of the heating tube.

The preferred type of hot water heating tank which I use in connection with my novel resistance elements is preferably of the storage type. In Fig. 1 I have shown a standard storage type heater, which may be designated 1, and which is preferably insulated, as at 2, whereby to conserve substantially all the heat units imparted from the water by the heating medium. The tank is preferably of relatively small cross section and relatively long with respect to this cross section whereby to hold a relatively high column of water of relatively small cross section.

The main electric resistance unit which I utilize in connection with my heater is preferably of the standard type, as illustrated in dotted lines at 3. This resistance unit may obviously be of any design or any type, and for the purpose of the present invention it is preferably a thousand watt unit although it will be obvious that the capacity of such resistance element may be changed relative to the capacity of the tank. Instead of immersing this resistance element directly in the water of the main tank I have provided an auxiliary heating tube which may be designated 4. This tube is preferably of the proportionate dimensions, as shown in the drawings, and not only completely encloses the resistance element but preferably extends the length of the water tank. This tube 4 is designed to be filled with water, or any other fluid whereby the resistance element may be immersed in the water in such auxiliary tube 4. The water in this tube 4 is preferably distilled water and the water of such tube will not cause formation of a material amount of scale upon the surfaces of the resistance element 3. It will thus be obvious that the resistance element 3 may be maintained or intermittently brought up to a heat which under ordinary circumstances would cause the formation of scale upon the same, but that being placed in the distilled water will effectively heat the main body of water without the formation of any scale upon the surfaces thereof. Scale is prevented from forming upon the heating tube 4 because of the relatively large volume of distilled water within the same which quickly dissipates and transmits the heat units from the resistance element to the large surface area of the tube 4 which is thereby maintained at a lower temperature than the resistance unit and thus preventing the deposit of impurities from the main body of water in the tank.

In order to maintain the tube 4 filled with fluid at all times and in order to initially use the water from the main supply line at the initial installation I have provided a novel means in the form of a coil 5 which is positioned at the top of the tube 4 and forms a relatively small helical passageway between the tube 4 and the main supply of water in the tank 1. This coil 5 is preferably somewhat smaller in diameter than the tube 4 and is preferably coiled in the manner shown in the drawings and of such a height that, when the water within the tube 4 expands, such water will not reach a height greater than the top outlet of the coil 5. In other words, the capacity of the coil 5 is such that it will take care of the entire volume of surplus water caused by the intermittent expansion of water within the tube 4. This is clearly illustrated in Figs. 2 and 3 of the drawings, Fig. 2 showing the main level of the distilled water within the tube 4 and coil 5 when the tank is cool, and Fig. 3 showing the approximate level of the distilled water in the tube 5 when the tank is hot and the water has expanded.

I refer to the water within the tube 4 as being distilled because of the fact that after the initial filling of the tube 4 with water from the tank 1, such initial water will be heated and distilled by the electrical resistance unit, and the only possible deposit of scale upon the element 3 will be caused by the heating of such initial supply of water. It will be obvious that when the tube 4 is once filled that the same water will remain in the tube 4 unless emptied out by the removal of the resistance unit 3. Such resistance unit 3 is preferably readily replaceable due to the connections 6 for positioning the resistance unit in the tube 4.

A suitable thermostat 7 is preferably positioned below the end of the inlet of a cold water supply pipe 8 which extends downwardly and centrally the length of the tank 1. This thermostat 7 extends transversely of the tank 1 and is preferably about equi-distantly positioned between the bottom end of the inlet pipe 8 and the part of the tube 4 containing the resistance element 3. This makes for accurate control of the low consumption heating unit 3 whereby it will maintain the water in the tank at a practical uniform temperature throughout. The thermostat 7 is preferably provided with a suitable electric switch control and is preferably connected in a standard manner through a suitable relay switch 9 to the electric resistance element 3. A suitable switch 10 is provided for shutting off the entire system.

Where the water heater is provided with only one low consumption electrical resistance unit 3 and one tube 4 it will take a relatively long time to initially heat the large body of water in the tank 1. However, it costs nothing to store a large amount of water, and when this water is once heated it is maintained at such temperature by such low consumption unit 3, and as such large body of water is designed to be more than enough to supply the usual needs it will be obvious that the tank will be constantly at an approximately uniform temperature. In some instances, however, it may be desirable to heat the immediate top portion of the water quickly. For this purpose I have provided a second heating tube 11 which preferably is positioned at the top of the tank 1 and extends transversely thereof. This tube is similar in construction to tube 4 and contains an electric resistance element 12 immersed in the distilled water contained within the tube 11 which water is prevented from mixing with the main body of water in the tank 1 by a suitable coil 13 which is designed to operate in the same manner as the coil 5. This heating tube 11 is connected in circuit with a suitable thermostat 14 and the relay switch 9ª, as will be well understood by those skilled in the art. The relay switch is preferably so designed that when the thermostat 14 is actuated at a predetermined time the flow of current through the resistance element 12 will cease and the heating of the tank maintained in control by the main resistance element 3. For instance, the thermostat 14 may be set so that when the water in the top part of the tank reaches 160° F. a suitable switch contained in the thermostat will be actuated to cut the resistance element 12 out of the system.

It will thus be seen that by the provision of two interconnected electrical resistance units that the top portion of the water in the tank may be quickly heated in case of any emergency by a resistance unit which is preferably a low consumption unit, say approximately 1000 watts, and when such portion of water is heated to a sufficient degree that the main body of water in the tank is heated and maintained by the main resistance unit 3 and tube 4. Under normal operation the resistance unit 12 will rarely come into use. In case the tank should be cold or more than the usual amount of water used such resistance unit would immediately come into use to quickly heat up the top portion of the water in the tank without causing a peak load. In the preferred operation of these combined resistance units the relay switch is arranged so that only one resistance element is connected in the circuit at the same time. To accomplish this the switch 10 is preferably a three way switch, in that it is either in the off position, or connects either the heating element 3 or the heating element 12 in the system. In other words, it is preferably arranged so that only one of the heating elements is connected into the main line at the same time.

In Fig. 4 I have shown a modified manner of draining tube 4 instead of removing the resistance element, as above explained. In this modified embodiment the tube 4 is preferably depressed at a point 15 near the base thereof, and in this depression is positioned a suitable check valve member 16. This check valve member 16 may be inserted into the tube 4, as shown, and is preferably of such a depth that it is flush with the periphery of the tube 4 whereby the entire tube and check valve may be inserted through the proper size aperture in the bottom of the tank. In operation of this check valve it will be obvious that as long as there is water in the main body of the tank that the ball check will remain in its lowermost position against the valve seat and keep the supply of distilled water within the tube 4. The top parts of the cage for the ball check, however, is so formed as to permit the passage of water past the ball check when in its uppermost position. It will therefore be obvious that when the water in the main tank is drained out that the ball check will rise and thus drain off the water in the tube 4 down to the level of the element 16.

In Fig. 1 I have shown the preferred arrangement of wiring for connecting the heating elements and thermostats with the relay switches and main control switch, in dotted lines. However, it will be understood by those versed in the art that the wiring for these various electrical elements may be arranged as desired, as this does not form a part of the present invention.

What I claim is:

1. A method of heating liquids in containers of the storage continuous supply type which comprises continuously maintaining a constant supply of water, separating a portion of the water from said main supply of water and heating said separate supply of water by means immersed in the same, and thereafter maintaining said independent body of water in contact with but so as to not intermingle with said main supply of water.

2. The method of heating water in tanks of the storage, continuous supply type, which comprises maintaining an independent column of liquid in the main body of liquid in the continuous supply tank and heating the independent column of liquid to in turn heat the liquid within the main storage tank, the main body of liquid being in contact with the independent column of liquid but not intermingling therewith.

3. The method of heating liquids in tanks of the storage, continuous supply, electric resistance type, which comprises surrounding the electric heating means with a body of distilled liquid to prevent the formation of scale on the heating means, and heating the main supply of liquid in the tank by transmitting the heating units through the distilled liquid to such main supply of liquid, the main supply of liquid being in contact with, but not substantially intermingling with the distilled liquid.

4. The method of heating liquids in tanks of the storage, continuous supply, electric resistance type, which comprises confining a relatively large mass of liquid to an upright body of relatively small cross section, confining an independent body of liquid within said large mass of liquid, and in contact with said large mass of liquid but not substantially intermingling therewith, heating said independent body of liquid by electrical resistance means to in turn heat said large mass of liquid, said electric resistance heating means having a relatively small consumption compared with standard practice, and heating the upper part of the large mass of liquid by heating a separate body of liquid confined within the main mass of liquid.

5. The method of heating liquids in tanks of the storage, continuous supply type, which comprises confining a relatively large mass of liquid to an upright body of relatively small cross section, heating the large mass of liquid by heating an independent body of liquid immersed therein, and in contact with the large mass of liquid but not substantially intermingling therewith, the heating units being derived from a heating medium having a relatively low consumption compared to standard practice whereby to slowly and continuously maintain the entire mass of liquid at the required temperature, and independently heating the liquid in the upper part of said large mass of liquid by independent heating means, said second named heating means being rendered ineffective when the liquid in the upper part of said upright body of liquid becomes heated to a predetermined temperature.

6. The method of heating liquid in tanks of the storage, continuous supply type, which comprises confining a relatively large mass of liquid to an upright body of relatively small cross section, normally heating the mass of liquid by a heating medium extending upwardly for substantially the length of the upright body of liquid, said heating medium being in contact with but not substantially intermingling with the large mass of liquid and independently controlling the heating of the upper part of said mass of liquid by heating means positioned only in the part of said mass of liquid.

7. The method of heating liquids in tanks of the storage, continuous supply type, which comprises maintaining a relatively large body of liquid, heating this relatively large body of liquid by a separate relatively small body of liquid and maintaining a relatively small body of liquid between said two bodies of liquid, whereby said two bodies of liquid will be prevented from mixing during the expansion or contraction of said small body of liquid.

8. A water heating apparatus of the storage, continuous supply type, comprising a storage container for holding a relatively large constant supply of water, an electrical heating unit positioned within the container, a tube surrounding said electrical heating unit and adapted to contain a permanent supply of liquid for surrounding said electrical heating unit, and means connected to said tube for permitting the expansion of the liquid in said tube and permitting the liquid in the tube to come in contact with the water in the container but substantially preventing intermixture of the liquid in the tube and the water in the container.

9. A liquid heating apparatus, comprising a container for receiving a main supply of liquid, an electrical heating unit positioned within said container, a smaller container surrounding said electrical unit and extending within the liquid within the container, and an independent supply of liquid within said smaller container and surrounding said heating unit for transmitting the heating units therefrom to the main supply of liquid, the independent supply of liquid being in contact with but not intermingling with main supply of liquid.

10. A water heating apparatus of the storage, continuous supply type comprising an upright storage container of relatively small cross section compared to its height, and designed to hold a relatively large constant supply of water compared to the heating units available, electrical heating means positioned within the container having a relatively low consumption compared to standard practice, a tube surrounding said electrical heating means, a coil positioned at the top of said tube serving as a passageway for water from said container into said tube, said coil being of such diameter and length as to hold all the water of expansion from said tube whereby to prevent mixing of the water in said container and the water in said tube.

11. A water heating apparatus of the storage, continuous supply type, comprising an upright storage container of relatively small cross section compared to its height and designed to hold a relatively large constant supply of water, an electrical heating unit of relatively small consumption in the bottom of said container for heating said relatively large supply of water, a tube surrounding said heating unit provided with distilled water, in contact with but not intermingling with the large supply of water, and a second heating unit of relatively low consumption positioned adjacent the top of said container for locally heating the water at the top of said container, and means for independently controlling the operation of said electrical heating units.

In testimony whereof I affix my signature.

WILLIAM J. HANDLEY.